United States Patent [19]

Garcia et al.

[11] Patent Number: 5,287,494
[45] Date of Patent: Feb. 15, 1994

[54] SORTING/MERGING TREE FOR DETERMINING A NEXT TOURNAMENT CHAMPION IN EACH CYCLE BY SIMULTANEOUSLY COMPARING RECORDS IN A PATH OF THE PREVIOUS TOURNAMENT CHAMPION

[75] Inventors: Leslie C. Garcia; David B. Lindquist; Gerald F. Rollo, all of Poughkeepsie, N.Y.

[73] Assignee: International Business Machines Corporation, Armonk, N.Y.

[21] Appl. No.: 599,609

[22] Filed: Oct. 18, 1990

[51] Int. Cl.⁵ ............... G06F 7/36; G06F 7/22
[52] U.S. Cl. ............... 395/600; 340/825.02; 364/282.1; 364/229.41; 364/DIG. 1; 364/974; 364/DIG. 2
[58] Field of Search ............ 395/800, 600, 325, 200; 370/60, 60.1, 61; 340/825.02

[56] References Cited

U.S. PATENT DOCUMENTS

| | | | |
|---|---|---|---|
| 3,713,107 | 1/1973 | Barsamian | 340/172.5 |
| 4,295,206 | 10/1981 | Cain et al. | 395/600 |
| 4,497,039 | 1/1985 | Kitakami et al. | 364/900 |
| 4,567,572 | 1/1986 | Morris et al. | 395/800 |
| 4,644,471 | 2/1987 | Kojima et al. | 364/300 |
| 4,734,877 | 3/1988 | Sakata et al. | 364/730 |
| 4,779,192 | 10/1988 | Torii et al. | 364/200 |
| 4,791,555 | 12/1988 | Garcia et al. | 364/200 |
| 4,799,152 | 1/1989 | Chuang et al. | 364/200 |
| 4,945,471 | 7/1990 | Neches | 395/325 |
| 5,121,493 | 6/1992 | Ferguson | 395/600 |

FOREIGN PATENT DOCUMENTS 078369 3/1989 Japan .

OTHER PUBLICATIONS

Gibson et al, "Engineering and Scientific Processing on the IBM 3090", IBM Systems Journal, vol. 25, No. 1, 1986, pp. 36-50.
Buchholz, "The IBM System/370 Vector Architecture", IBM Systems Journal, vol. 25, No. 1, 1986, pp. 51-62.
Torii et al, "CPU Integrated Data Base . . . Data Bases", Nikkei Electronics, No. 414, Feb. 1987, pp. 1-57.
Lorin, "Sorting and Sort Systems", 1975, pp. 59-86.
Vector Operations—IBM Publication #SA22-7125-3 Fourth Edition—Aug. 1988.
IBM TDB vol. 20, No. 7, Dec. 1977, W. M. Connor, "Offset Value Coding", pp. 2832-2837.
IBM TDB vol. 15, No. 1, Jun. 1972, F. Tsui et al, "Arrangement to Speed . . . Exchanges", pp. 297-304.

*Primary Examiner*—Thomas C. Lee
*Assistant Examiner*—Paul Harrity
*Attorney, Agent, or Firm*—Bernard M. Goldman; Richard M. Ludwin

[57] ABSTRACT

A tree sorter having hardware logic node registers and output selectors plus comparators enables a vector processor to perform sort and merge operations. A system and method of providing one output record each cycle provides performance enhancement over similar scalar operation. Storage to storage traffic is drastically reduced because the hardware tree and update logic is implemented in the Vector Processor. Vector registers provide input data to the hardware tree structure. Output records sorted by key together with address ID are placed in storage. Multiple Vector count and multiple Vector Interruption Index (VIX) operation, string length and merge masks are used in conjunction with a vector merge instruction. The data input record key field has both long and short formats. Actual key data or codewords may be used. The vector merge forms a new codeword when compare equal codewords are encountered. By storing sorted keys (codewords) plus the address ID, reuse of codewords (in formation of longer strings, etc.) is made possible.

3 Claims, 11 Drawing Sheets

FIG. 8
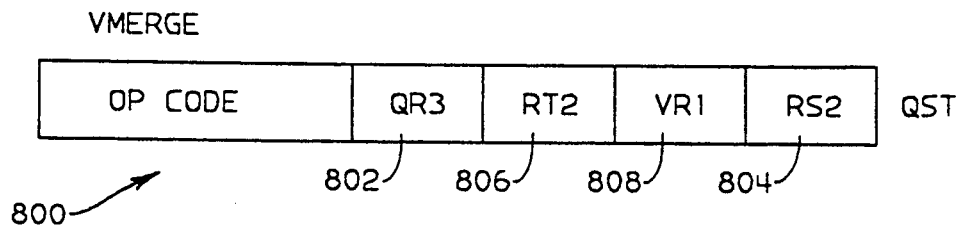
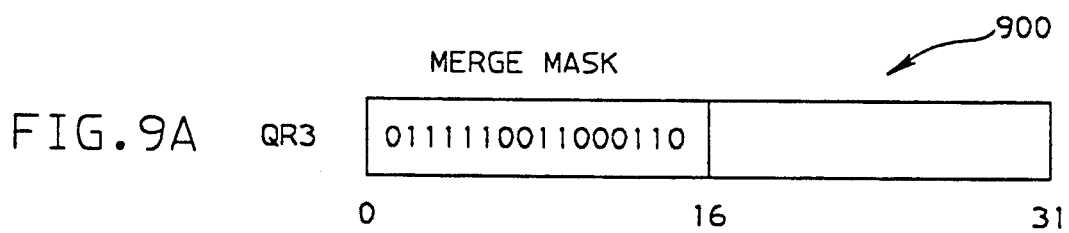
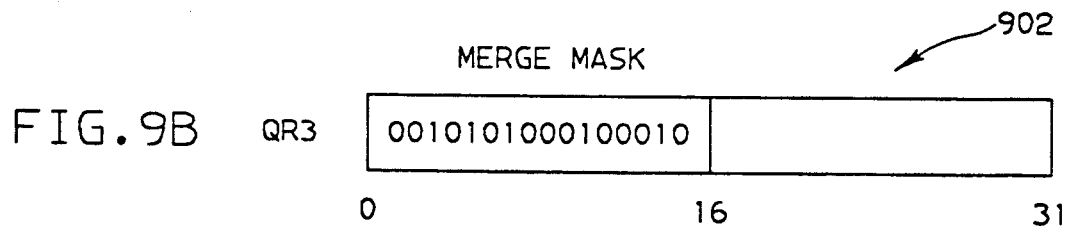
FIG. 10
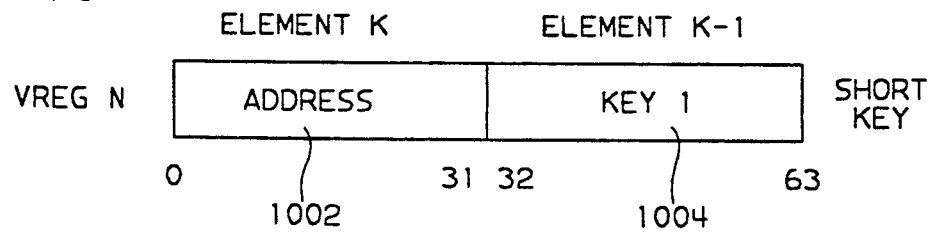

SORTING/MERGING TREE FOR DETERMINING A NEXT TOURNAMENT CHAMPION IN EACH CYCLE BY SIMULTANEOUSLY COMPARING RECORDS IN A PATH OF THE PREVIOUS TOURNAMENT CHAMPION

BACKGROUND OF THE INVENTION

1. FIELD OF THE INVENTION

This invention relates to database processing.

2. RELATED ART

Database processing is a widely known and commercially significant aspect of the data processing field. A database is a collection of data organized into records. Computer operations which are performed on and/or using these data records are referred to as database processing. A database manager is the package of database processing operations used to access and manipulate the database.

Database processing commonly involves operations such as sorting and merging. Sorting, in the data processing sense, is the rearrangement of elements or keys in ascending or descending order. Merging, is the interleaving of elements or keys from two or more ordered lists. Conventionally, sorting and merging have been performed by software algorithms requiring significant amounts of processor execution time. In large databases, the processor execution time can be prohibitive, significantly degrading the performance of software database managers.

One well known method of sorting and merging is by way of a replacement selection algorithm. Replacement selection is the process of replacing one key by another in a tournament tree. An example of a replacement selection type multiway merge will be explained by reference to FIGS. 1 and 2.

FIG. 1 shows a 16 way tournament tree having 16 external nodes at its base (nodes 16-31) and 15 internal nodes in the tree body (nodes 1-15). An extra node (node 0) is appended at the top of the tree to indicate the champion of the tournament. Initially, the external nodes are filled with keys. The internal nodes of FIG. 1 are shown filled with "winners" assuming that the tree is regarded as a tournament to select the smallest key.

In replacement selection methods, as the winning key advances up the tree, it is replaced by the loser of the tournament at the previous level. FIG. 2 shows the same tree as FIG. 1 with the losers represented instead of the winners. Also, in the tree of FIG. 2, it will be observed that a next key "K" replaces the previous champion key "A" in external node 19. Assuming that the external nodes (16-31) are fed by ordered lists of keys, one only needs to compare the new comer "K" with the keys "C", "B", "D", "E" in order to determine the new state of the tree in order to determine a new tournament champion.

From FIGS. 1 and 2 it will be apparent that the illustrated replacement selection method requires four cycles of comparison to determine a tournament champion. For example, where the "K" at external node 19 is the next key to enter the tournament (as illustrated in FIG. 2), the four cycles of comparison proceed as follows:

1. "K" (node 19) is compared with "C" (node 9). Since "K" loses, it replaces "C" at node 9. The winner "C" is temporarily stored for the next cycle of comparison.

2. "C" (the winner of cycle 1) is compared with "B" (node 4). Since "C" loses, it replaces "B" at node 4; The winner "B" is temporarily stored for the next cycle of comparison.

3. "B" (the winner of cycle 2) is compared with "D" (node 2). Since "B" wins, it does not replace "D" but rather remains temporarily stored for the next cycle of comparison.

4. "B" (the winner of cycle 3) is compared with "E" (node 1). Since "B" wins it does not replace "E" but is instead moved to node 0. "B" is the tournament champion for this round.

As will be apparent from the foregoing example, the next new key would enter the tree from external node 17 (the source list of the previous champion, "B") and the next round of comparison would start from that point.

As is known in the art, offset codes and codeword comparisons can be used as an alternative to the comparison of actual keys within the structure of FIGS. 1 and 2. The use of offset value coding in a tournament tree is discussed in more detail in the article *OFFSET VALUE CODING*, by W. M. Conner, IBM technical Disclosure Bulletin Vol. 20, No. 7, December 1977, pp. 2832–2837, which is incorporated by reference, in its entirety, as if printed in full below.

One limitation of conventional tournament tree sorts and merges is that the number of cycles of comparison increases with the number of levels of the tree. Thus, in a replacement selection sort or merge using a tree having N levels of internal nodes, N cycles of comparisons are conventionally performed to determine a winner. These cycles of comparison, and the sort/merge operations in general can be a heavy burden on the central processors of even a large mainframe computer system. This is particularly so in light of the fact that operations on a large database can require the sorting or merging of lists comprising hundreds of millions of keys.

Multiway merging, sorting and replacement selection are discussed in more detail in the books *SORTING AND SEARCHING*, by Donald E. Knuth, published by the Addison-Wesley Publishing Company, Library of Congress Catalog Card. No. 67-26020, and *SORTING AND SORT SYSTEMS*, by Harold Lorin, published by Addison-Wesley Publishing Company, Inc., Library of Congress Catalog Card No. 73-2140, copyright 1975, both of which are incorporated by reference, in there entirety, as if printed in full below.

II. SUMMARY OF THE INVENTION

It is an object of the invention to offload the central processing unit of sort/merge tasks by exploiting the vector registers within a vector processor to perform tournament tree merges and sorts.

It is a further object of the invention to accelerate the performance of a tournament tree merges and sorts in such a manner that a winner can be determined in a single clock cycle.

In its preferred embodiment, the merge sort of the present invention uses the vector registers as a source of input to a tournament tree which is implemented in hardware within a vector element. The tournament tree comprises node registers, input/output selection circuits, and comparators to run tree update tournaments.

III. BRIEF DESCRIPTION OF THE DRAWINGS

FIG. 8 illustrates an embodiment of a vector merge (VMERGE) instruction for use by the vector facility of FIG. 3.

FIG. 9A is a more detailed illustration of a merge mask specified by the QR3 operand of a short key VMERGE instruction of the format illustrated FIG. 8.

FIG. 9B is a more detailed illustration of a merge mask specified by the QR3 operand of a long key VMERGE instruction of the format illustrated in FIG. 8.

FIG. 10 illustrates the format of vector register data using a short key version of the VMERGE instruction.

Like reference numeral appearing in more than one figure designate like components.

IV. DESCRIPTION OF THE PREFERRED EMBODIMENTS

The below-described embodiment of the present invention provides a 4 to 1 improvement over the previously described replacement selection tree method. Even larger improvements are achievable for embodiments representing trees having larger numbers of levels. High vector register bandwidth enables multiple level compares in each cycle. Thus one winner per cycle is achieved In the preferred embodiment, the vector merge/sort maintains a tournament tree structure and associated logic in registers within the hardware of an otherwise conventional vector processor such as an IBM ESA/370 vector facility. A suitable vector processor of this general type is described, for example, in U.S. Pat. No. 4,791,555 to Garcia et. al. and assigned to the same assignee as the present invention. U.S. Pat. No. 4,791,555 is incorporated by reference, in its entirety, as if printed in full below.

The vector sort/merge hardware will now be described in more detail with reference to an IBM ESA/370 vector facility. It should be understood, however, that the sort/merge hardware can also be used in conjunction with other conventional vector processors. Further, many of the principles described herein can be applied to embodiments using a scalar processor.

The IBM ESA/370 Vector Facility and associated instructions are described in detail in the the publication *IBM Enterprise Systems Architecture/370 and System/370 Vector Operations,* Publication Number SA22-7125-3 (available From International Business Machines Corporation, Armonk, New York), which is incorporated by reference, in its entirety, as if printed in full below.

Figure 3:
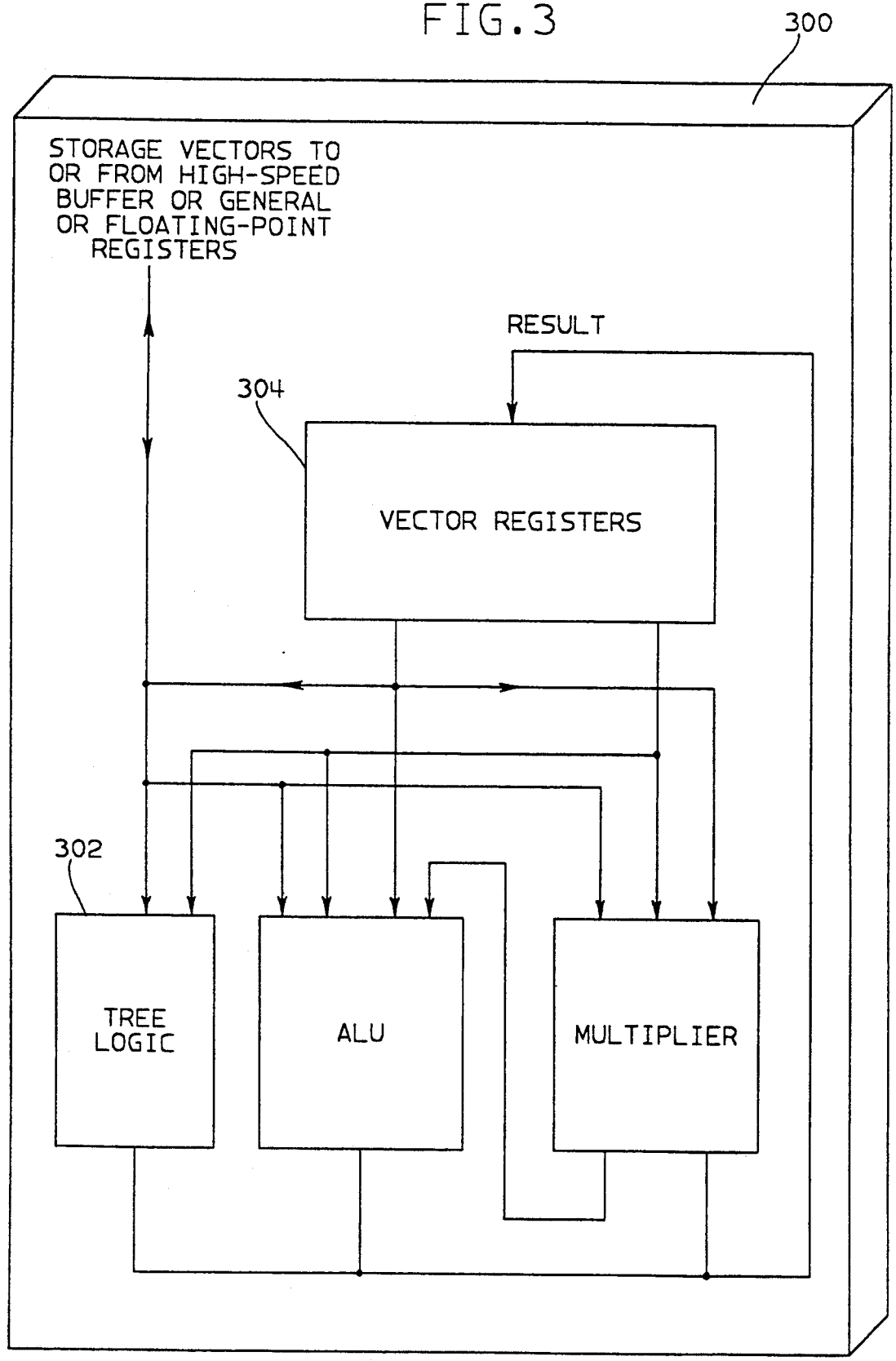
FIG. 3 is a block diagram of an ESA/370 vector facility including tree logic according to an embodiment of the present invention.

A vector facility, including a tournament tree structure according to an embodiment of the present invention, is illustrated in FIG. 3. Tree logic 302 is provided as part of a vector processor 300. The tree logic 302 receives data from the vector registers 304 which serve as the base nodes of a tournament tree. When the tree logic 302 determines a tournament champion, it sends data identifying the champion to the storage buffer of a host computer (not shown). Alternatively, the data identifying the champion can be fed back into the vector registers 304 for further processing.

Figure 4:
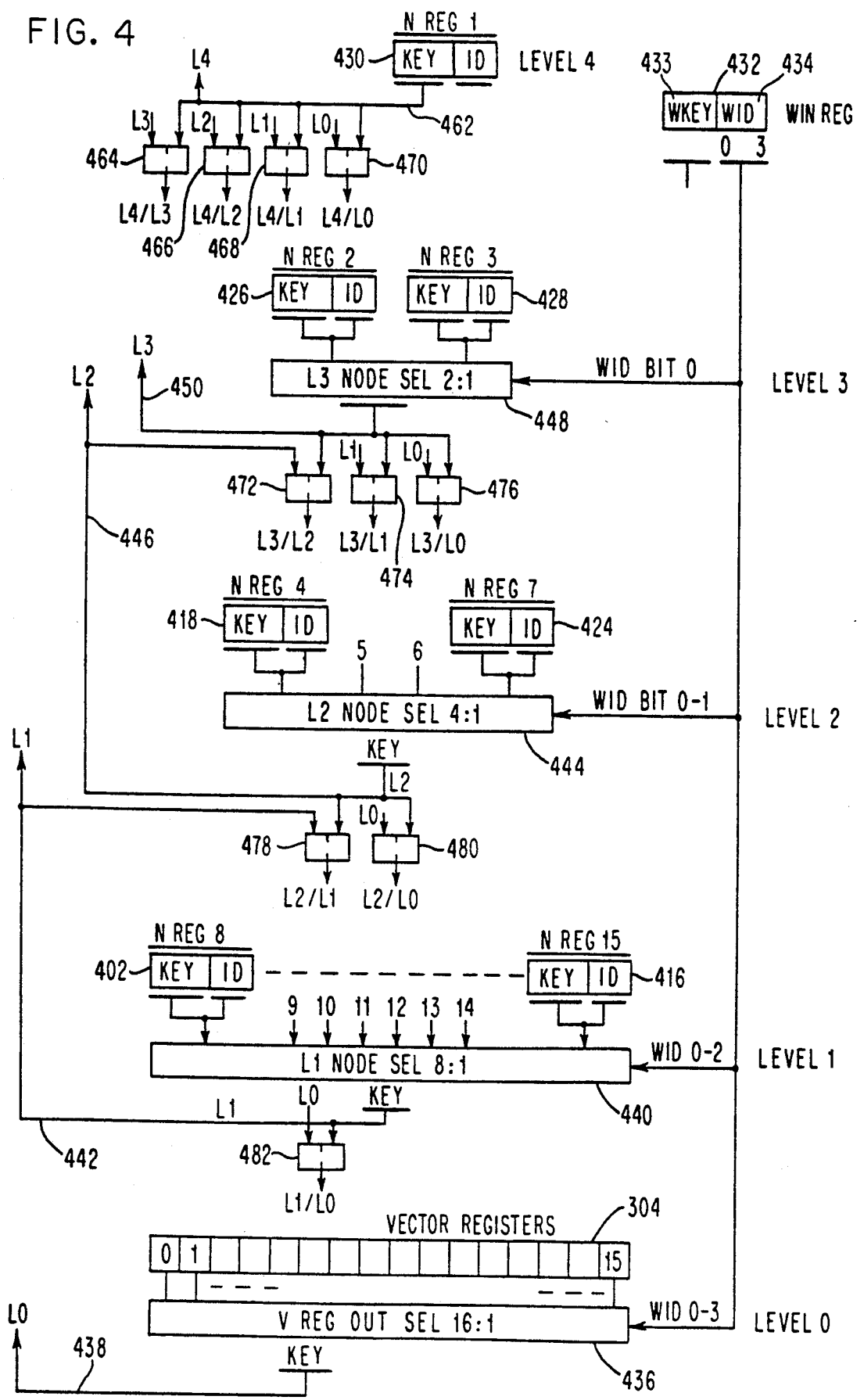
FIG. 4 illustrates an embodiment of a four level hardware tree, including node output selection logic and logic for generating comparison results, for use within the tree logic of FIG. 3.

FIG. 4 illustrates the tree logic 302 and its connection to the vector registers 304 in more detail. As illustrated in FIG. 4, sixteen vector registers (VREGs) 304 are used as data streams to feed the tree. These sixteen vector registers act as the base nodes of the tournament tree. Data streams are brought into the vector registers 304 in sections, under control of the IBM System 370 Vector Sectioning instruction and Vector Load instructions. The remaining nodes (corresponding to nodes 1-15 of the tournament tree of FIG. 2) are embodied as 15 node registers 402-430 configured within the vector facility hardware. A champion key register 432 is also provided to store the tournament champion and the least significant four bits of its origin node address.

Each of the vector registers 304 has its own vector interruption and vector interruption index (VIX). A unit of operation is one tree update and selection of a tournament champion. Instruction completion is an entire merge of all streams or when a vector register requires a refill.

Each of the vector registers 304 holds a plurality of elements. It takes two of these elements to hold each tournament candidate. Each candidate includes an address portion (the first element) and an index portion (the second element). The VIX points to the next candidate, thus each time a candidate becomes the tournament champion the appropriate VIX is incremented by 2 so as to point to the elements of the next candidate.

Each of the 15 node registers 402-430 and the champion key register 432 comprise one 32 bit register and one 4 bit register. The 32 bit register (KEY) holds key data. The 4 bit register (ID) is used to identify which vector register the key originated from. In the case of the champion key register 432, a 32 bit registers holds the champion key (WKEY) 433 and a 4 bit register holds ID (WID) 434 of the champion key. When a tournament champion is selected, the 4 bit WID 434 and 16 bit VIX read the 31 bit vector register address. The address is combined with the Key to form the merged record for storage.

The sixteen vector registers 304, corresponding to the base nodes (16-31) of the tournament tree, are connected to a 16:1 multiplexor (MUX) 436 and assigned addresses 0-15, respectively. Bits 0-3 of the champion key identification number (WID) 434 are used as a MUX address to select one of the sixteen vector registers 400-430, whose contents will appear on the 16:1 MUX output. The output of the 16:1 MUX 436 is connected to a first multibit data bus 438 which carries the data from the selected vector register to comparators 470, 476, 480 and 482.

The eight level 1 (L1) node registers 434-448, corresponding to nodes 8-15 of the tournament tree, are connected to an 8:1 MUX 440. Bits 0-2 (the most significant 3 bits) of the champion key identification number 434 are used as a MUX address to select one of the light L1 node registers 402-416, whose contents will appear on the output of the 8:1 MUX 440. The output of the 8:1 MUX 440 is connected to a second multibit data bus 442 which carries the data from the selected L1 node register to comparators 468, 474, 478 and 482.

The four level 2 (L2) node registers 418-424, corresponding to nodes 4-7 of the tournament tree, are connected to a 4:1 MUX 444. Bits 0 and 1 (the most significant two bits) of the champion key identification number 434 are used as a MUX address to select one of the four L2 node registers 418-424 whose contents will appear on the output of the 4:1 MUX 444. The output of the 4:1 MUX 444 is connected to a third multibit data bus 446 which carries the data from the selected L2 node register to comparators 466, 472, 478 and 480.

The two level 3 (L3) node registers 426,428, corresponding to nodes 2 and 3 of the tournament tree, are connected to a two to one multiplexor 448. Bit 0 (the most significant bit) of the champion key identification number 434 is used as a MUX address to select one of the two L3 node registers 426,428 whose contents will appear on the output of the 2:1 MUX 448. The output of the 2:1 MUX 448 is connected to a fourth multibit data bus 450 which carries the data from the selected L3 node register to comparators 464, 472, 474 and 476.

Finally, the level 4 (L4) node register (NREG1) 430, corresponding to node 1 of the tournament tree, is connected to a fifth multibit data bus 462 which carries the key data from the L4 node register 430 directly to four comparators 464-470.

As explained in the background section of this document, a given round of a tournament will start from the node of origin of the champion key. Thus, as will be observed from FIG. 4, the identification number (WID) 433 of the most recent champion determines the path up the tree. The identification number (ID, WID) is a four bit binary representation of the MUX address (on MUX 436) of the vector register from which a key first entered the tournament tree.

Figure 2:
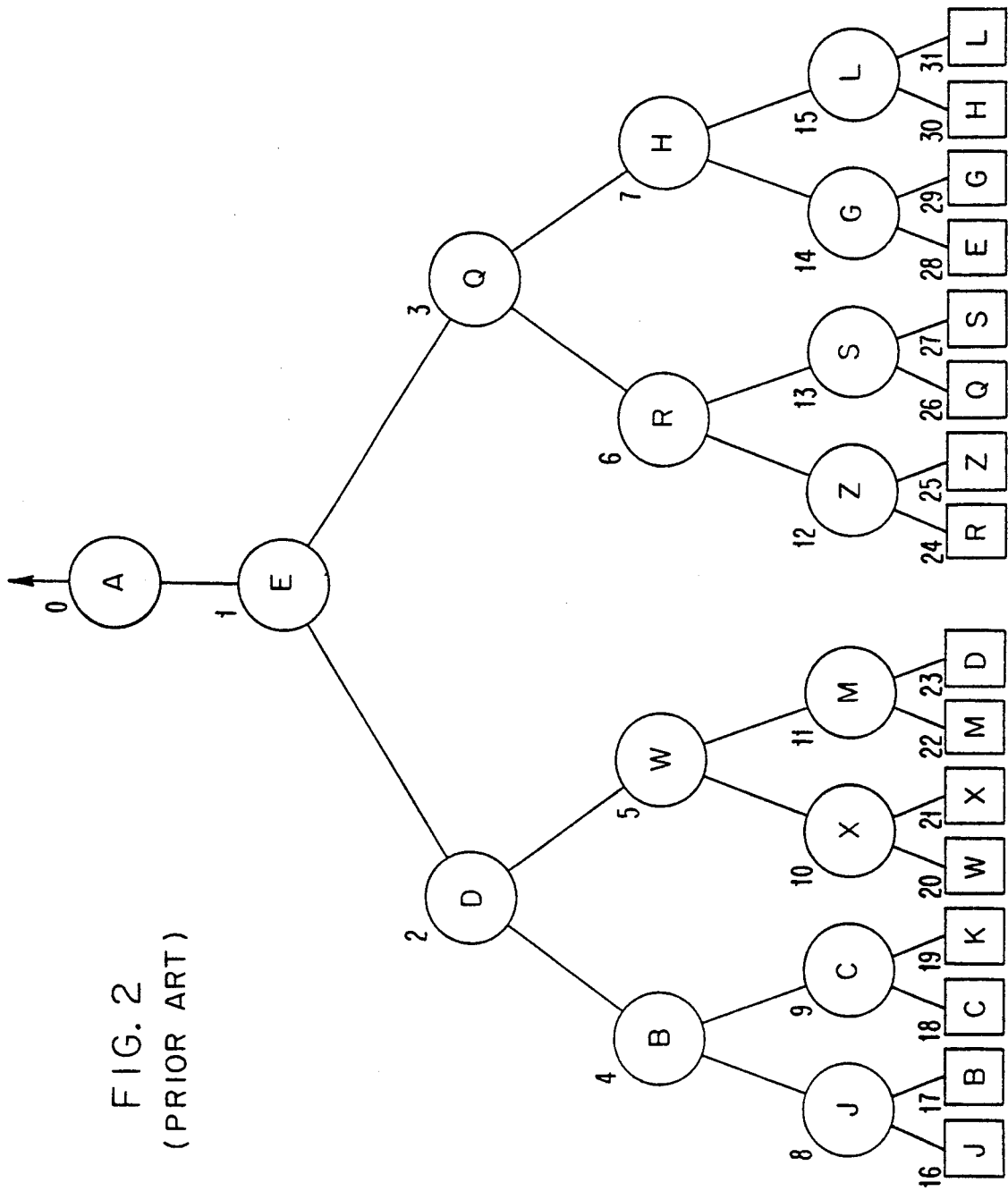
FIG. 2 is a diagram of a prior art database managing system.

For example, in FIG. 2, the first champion key "A" entered the tree from vector register 3 (address 0011 binary of MUX 436). Thus the ID of the "A" key (which is also the first WID) would be 0011 binary. As explained above, the only keys involved in the determination of the next tournament champion will come from vector register 3 (L0 MUX address 0011), node register 404 (L1 MUX address 001), node register 418 (L2 MUX address 00), node register 426 2 (L3 MUX address 0), and node register 430 (no MUX address needed since only one register is involved).

From FIG. 4 and the above example it will be observed that each of the registers at a given level is addressed, via the MUXes 436,440,444,448 by the least significant N bits (where N=4—level number) of the its corresponding node number.

The tournament tree hardware of FIG. 4 includes 10 comparators 464-482 which perform the necessary comparisons to determine a tournament champion. The comparators are preferably of the type that produces multibit binary output that indicates whether the quantity on the left input side is greater than, less than or equal to the quantity on the right input side.

As will be observed from FIG. 4, the node register 430 at level 4 has it contents compared with the contents of all selected registers below (L4/L3, L4/L2, L4/L1, L4/L0) by a set of four comparators 464-470. Similarly, the selected node register at level 3 has its contents compared with the contents of the selected registers at levels 0-2 (L3/L2, L3/L1, L3/L0) by set of three comparators 472-476. Further, the selected node register at level 2 is compared with the contents of the selected registers at L1 and L0 by a set of two comparators 478,480, while the selected node register at level 1 is compared with L0 by a single comparator 482. Thus, 10 comparison results are formed at the outputs of the comparators 464-482.

Figure 5:
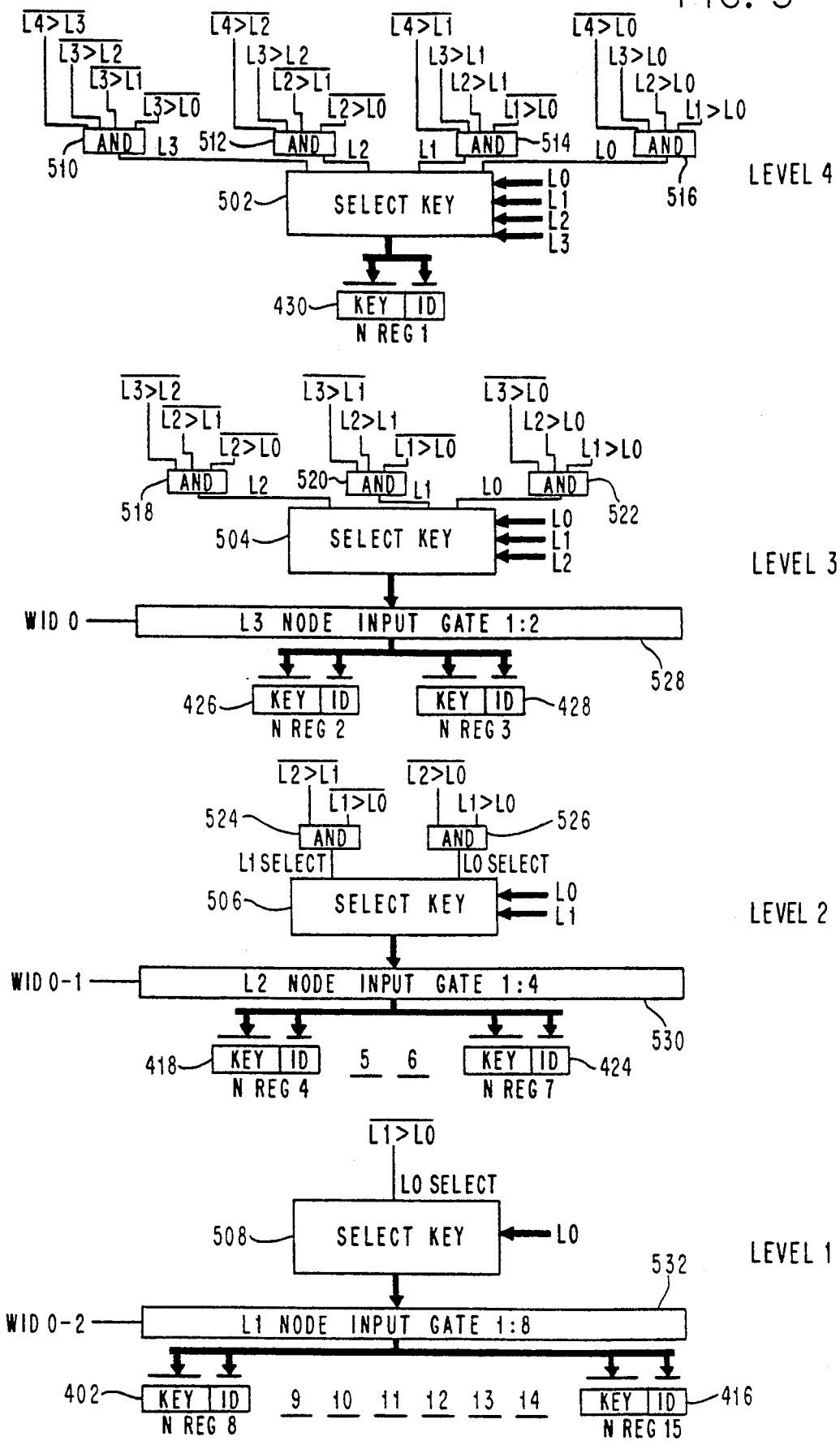
FIG. 5 illustrates and embodiment of node input gating logic, for use in the tree logic of FIG. 5, for writing keys into updated node/register positions in the tree of FIG. 4.

FIG. 5 shows node input gating logic which uses the 10 compare results from the logic of FIG. 4 to set the losing key, at each level, into the appropriate node register. As illustrated in FIG. 5, four "select key" multiplexors 502-508 are used to gate the losing key at each level into the proper node register, as determined by the champion key ID (WID). The keys, selected by the node output selection logic of FIG. 4, are latched for one cycle, as inputs into the appropriate selection multiplexors 502-508.

As will be observed from FIG. 5, the comparison results from the comparators of FIG. 4 are input to a number of "AND" gates 510-526 which are used to determine the loser at each level. The result generated by the "AND" gates, identifies the loser's level of origin. The result at each level is used as a selection input (or address) into the corresponding select key multiplexor 502-508. At any given level, only one AND gate (if any) will produce a "true" result, thus selecting a single latched key from the input of the selection multiplexor. If none of the "AND" gates connected to a given select key multiplexor produces a "TRUE" result, the contents of the selected node register are left intact.

For example, if the conditions of the far left "AND" gate 510 at level 4 were met, the L3 key (latched in to the right side of the select key multiplexor 502 from bus 450) would be written into node register 1 (reference numeral 430). Since the conditions set up for each gate are mutually exclusive, no other "AND" gate connected to the level 4 select key multiplexor will produce a "TRUE" result.

It will be observed that at level 1, the L1/L0 comparison results are fed directly into the selection multiplexor 508. At this level, the L0 key will be selected as the looser when L1>L0. Otherwise, the contents of the selected node register at this level are left intact.

At levels 1-3 of the tree (nodes 2-3, 4-7 and 8-15) the node input gates 528-532 select the proper node (at each level) at which to write the selected key. The node input gates 510-526 are multiplexors which use the WID from the previous cycle to select an output. In operation, the WID 434 of the champion key from the previous cycle is latched, for one cycle, as the select input to the node input gates 528-532. Using the latched WID, the node input gates select a node register (at each level) in which to write the key selected by the corresponding select key multiplexor (which is connected thereto). At each node input gate, progressively larger latched WIDs select the node registers from left to right (e.g. at gate 532, a latched WID of 000 would select node register 8 402 while a latched WID of 111 would select node register 15 416). No MUX is provided at level 4 since only one possible destination node register is involved.

Figure 6:
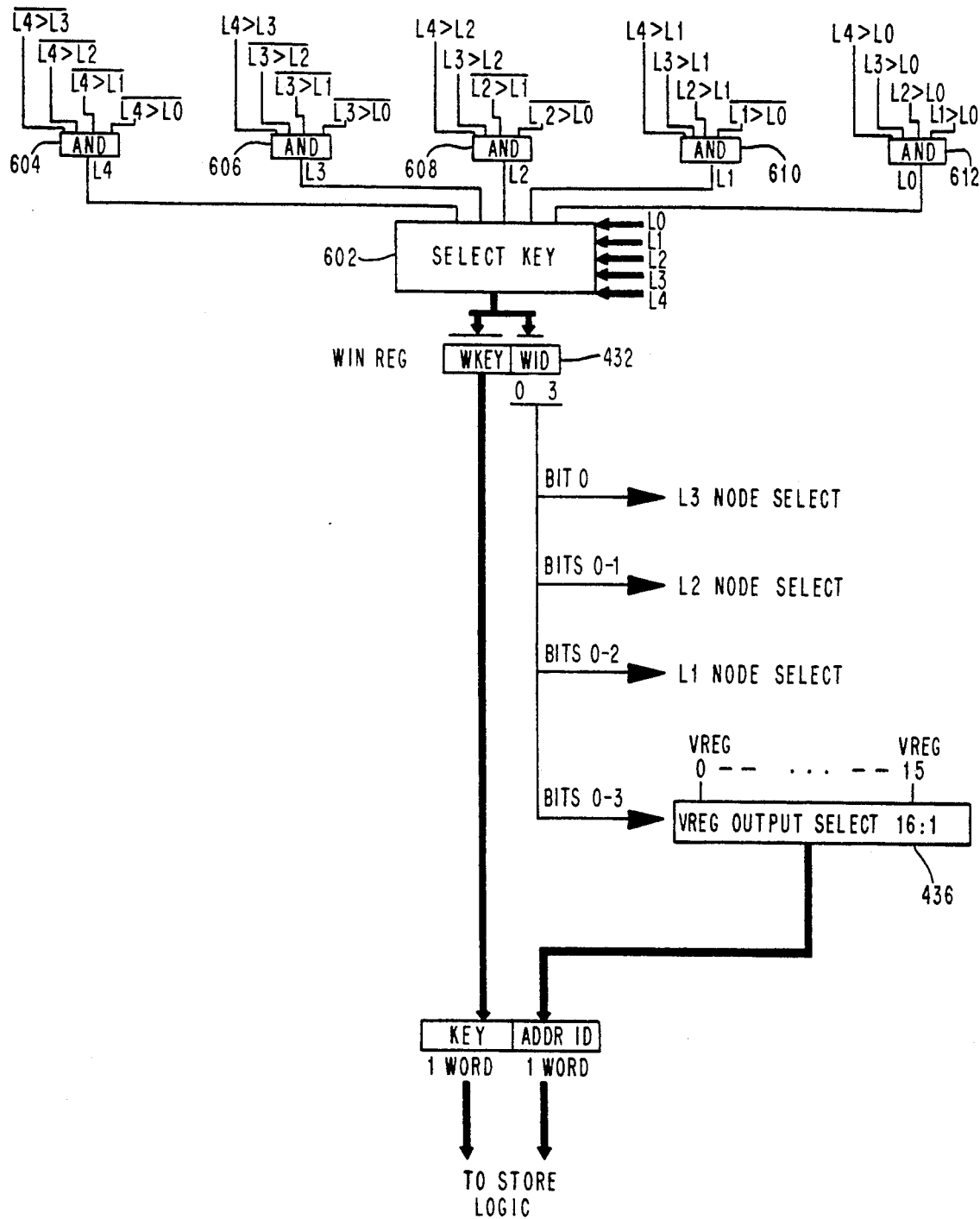
FIG. 6 illustrates an embodiment of champion determination and output gating logic, for use in the tree logic of FIG. 5, for determining the tournament champion in a single cycle of comparison using the comparison results generated by the logic of FIG. 4.

FIG. 6 shows the hardware for writing the champion key and ID into the winning key register 432 of FIG. 4. The keys selected from the previous cycle (on busses 438,442,446,450) are latched into the right side of the select key multiplexor 602. In order to determine the new tournament champion, the comparison results from the comparators 464-482 of FIG. 4 are input to a number of "AND" gates 604-612, in the manner illustrated in FIG. 6. As with the "AND" gates of FIG. 5, only one "AND" gate (if any) attached to the select key multiplexor 602 will produce a "TRUE" result during a given cycle of comparison.

The selected key (of those latched into the right side of the select key multiplexor 602) is the new champion. The new champion key and its ID are loaded into the winning key register 432. As depicted in FIG. 6, the ID (WID) of the winning key is used as the select input of the 16:1 VREG selection MUX (which also appears on FIG. 4). As explained with respect to FIG. 4, the WID selects its vector register of origin while the lower order bits of the WID select the proper node registers for the next cycle of comparison. Again, as described with reference to FIG. 4, the selected node registers will correspond to the path that the champion key would have taken to reach the top (node 1) of the tree. The new champion key (KEY) from the winning key register is sent to the vector processor store logic along with the address of its vector register of origin.

An example of the operation of the tree logic of FIGS. 4-6 will now be described with reference to FIGS. 7A and 7B.

As a first step in the operation of the vector merge-sort, the node registers are initialized to determine the first champion key. For example, initialization can be accomplished by (1) loading the non-base nodes of the tree with low dummies (automatic winners) and then, (2) starting from left to right on the base, comparing each key at a given node N to the key at its parent node INT(N/2), (3) advancing the losing key into the parent node (or keeping the losing key intact in the parent node as the case may be), and (4) comparing the winning key to the key in the next highest parent node up the tree until a comparison has been made between a key at the root node (node 1) and a key in a direct root sibling (nodes 2 or 3). The winner of this last cycle of comparison is then moved into the winning key node (node 0), the loser is left intact, and the comparisons continue from the next base node N+1 until each key in the base has had an opportunity to advance up the tree.

When the key originating in right most base node (e.g. VREG 15 in the tree of FIG. 7A) advances up the tree, a non-dummy element will emerge as a winner. At this point, the tree is initialized, the winner is sent to the system storage logic and the next element to be loaded on the tree is selected by the ID of the winner, WID.

Another example of an initialization method, which is specifically adapted for use with the vector merge-sort hardware, is to load the tree registers 402-430 and the winning key register 432 with low dummies and arrange the IDs so that the original champion ID indicates that vector register 0 is its origin and so that each subsequent champion indicates that the next vector register (1,2,3 . . . 15) is its origin. When initialization is performed in this manner, the low dummy values are initially latched into the select key multiplexors of FIGS. 5 and 6. Similarly, the appropriate bits of WID 00000 are latched into the node input gates 528-532 of FIG. 5. In either of the two above-described methods, initialization is recognized as being complete by the fact that the champion key is not a low dummy.

It should be understood that in addition to the methods described above, a number of conventional initialization methods can also be used. A more detailed description of tournament tree initialization can be found in U.S. Pat. No. 5,210,870 to Baum et al (filed Mar. 27, 1990 and assigned to the same assignee as the present invention), which is incorporated by reference in its entirety.

Figure 1:
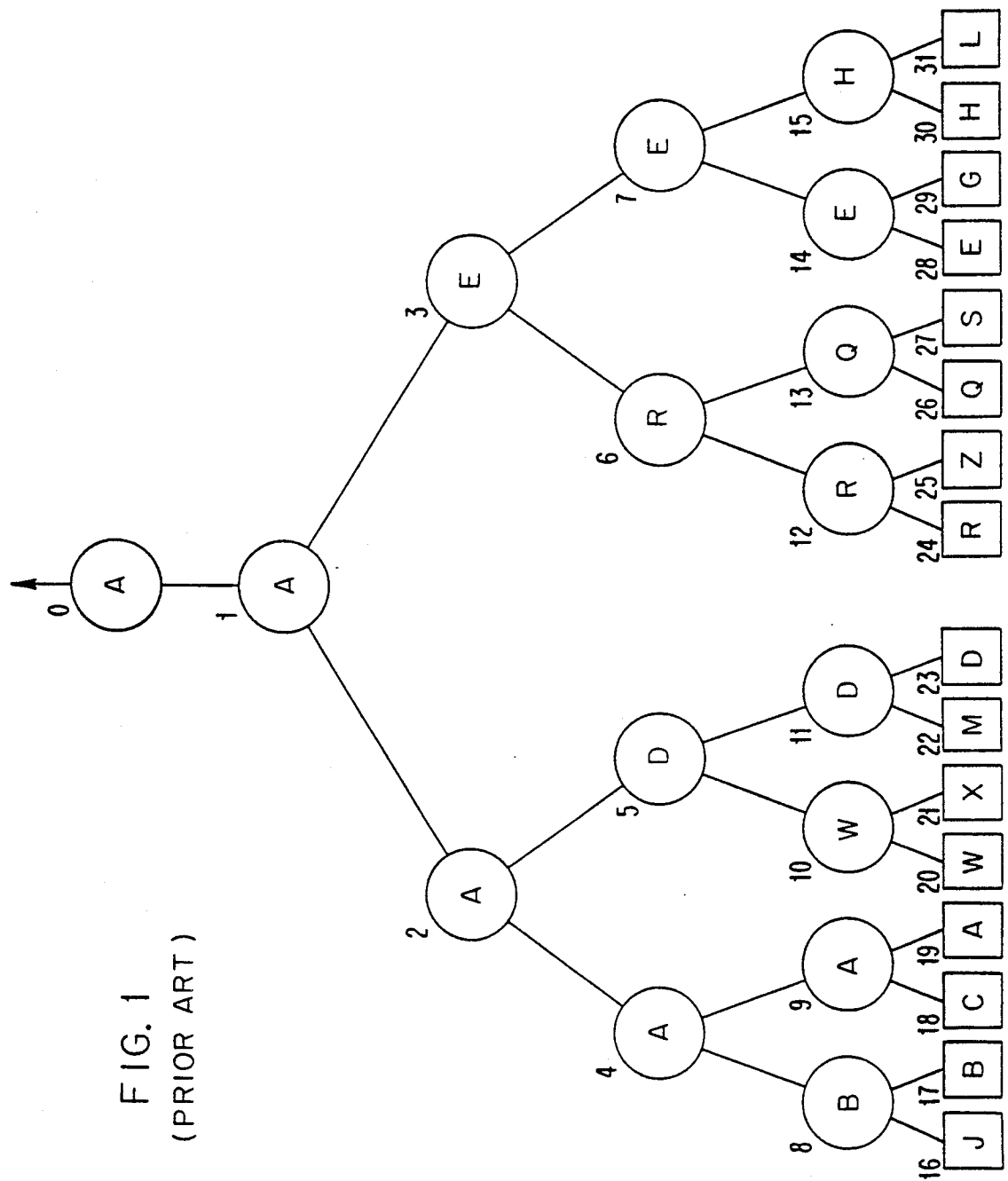
FIG. 1 is diagram of a prior art sort processor system.
Figure 7A:
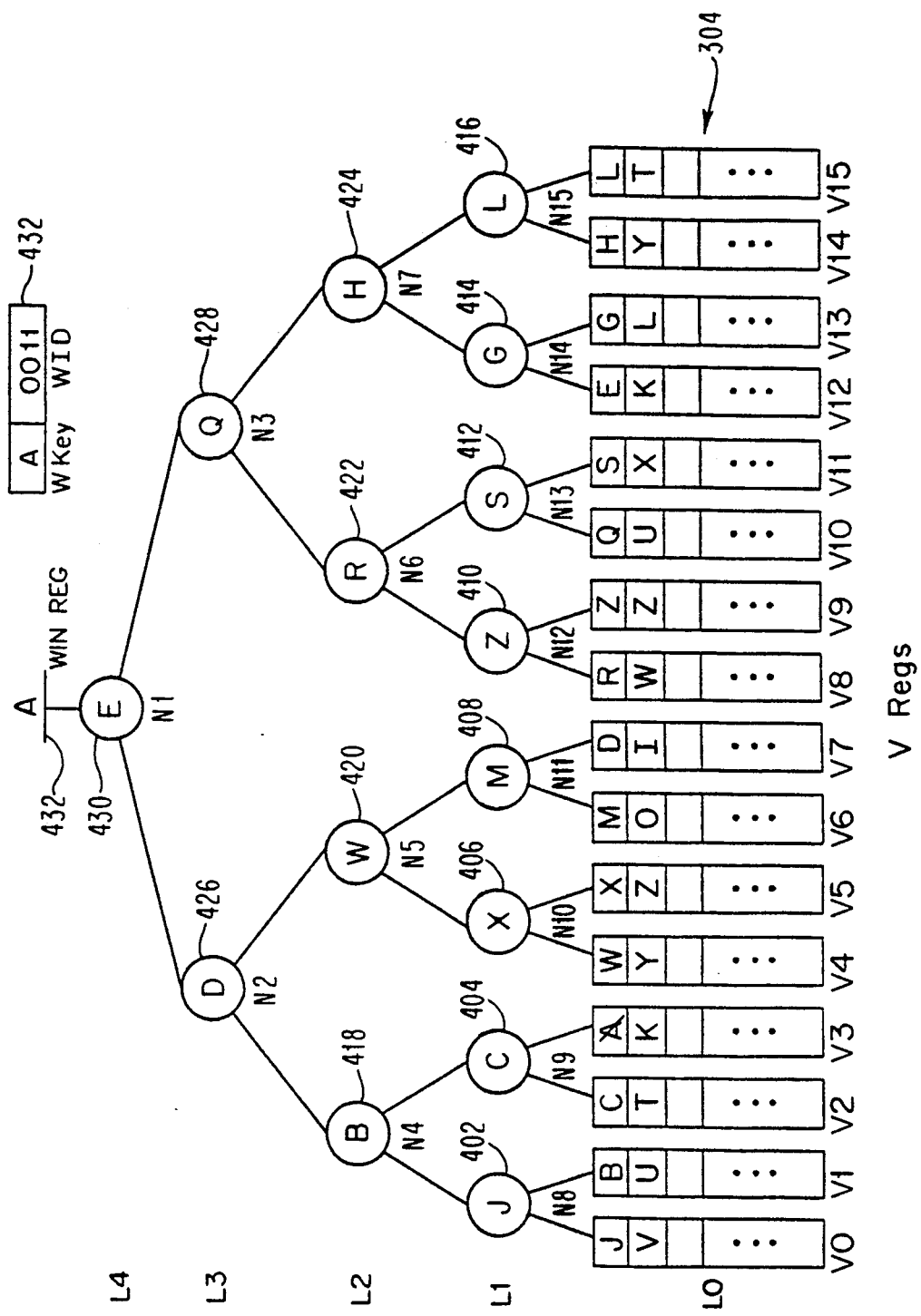
FIG. 7A is a tournament tree showing the correspondence between the node registers, the vector registers, the winning key register of FIGS. 3-6, and the tournament tree of FIG. 2.

FIG. 7A is a tournament tree showing the correspondence between the node registers, the vector registers, the winning key register, and the tournament tree of FIG. 1. As illustrated in FIG. 7, the vector registers (V0-V15) 304 form the base of the tree, corresponding to nodes 16-31. Each node register 402-432 has a number (N1-N15) corresponding to its equivalent node on a conventional tournament tree. The winning key register 432 corresponds to node 0. As shown in FIG. 7A, the winning key register 432, holds the KEY value and ID of the winning key. The letters within each of the node and vector registers represent keys. It should be understood that each of the node and vector registers also hold the ID associated with the illustrated key.

The tournament tree of FIG. 7A also shows the vector, node and winning key registers 304, 402-432 of FIG. 4 in the state they would be in one cycle after initialization, just after the first champion key ("A") and its associated ID (0011 bin) have been loaded into the champion key register 432. For future reference, N will refer to the end of this cycle and N+1, N+2, N+3 . . . will refer to the end of subsequent cycles.

Turning now to FIG. 4, it should be understood that at the end of cycle N, WID=0011. The appropriate bits of the WID (0011) are latched into the select inputs of the are also used to address the selection MUXes 436, 440, 444, 448 at each level (as previously described), thus producing the results L0="K", L1="C", L2="B", L3="D" and L4="E". These values are latched into the right side of each of the select key MUXes 502-508, 602 of FIGS. 5 and 6. Also, it will be observed that given the L0-L4 values selected above, the comparators 464-482 will produce the following 10 results: L4>L3, L4>L2, L4>L1, L4≦L0, L3>L2, L3>L1, L3≦L0, L2≦L1, L2≦L0, L1≦L0. The comparison results (or the inversion thereof where indicated) are latched into the inputs of the "AND" gates 510-526, 604-612 of FIGS. 5 and 6.

Cycle N+1 will now be described. Turning first to FIG. 5, it will be understood that the WID, selected keys and comparison results from cycle N have been latched into the appropriate hardware as described above. This data is used by the apparatus of FIG. 5 to write the losing (non-champion) keys back into the proper node registers during cycle N+1. Looking first at Level 1, it will be seen that the L1 node input gate 532 is addressed by bits 0-2 of the WID, while the select key MUX 508 is addressed by L1≦L0. If this condition (L1≦L0) is not met, no data will be written into the selected level 1 register and the existing data will remain intact. In the present example, L1≦L0 as indicated by comparator 482 (FIG. 4). Thus, the latched L0 key ("K") will be written into the node register selected by the WID bits 0-2 (001). Since NREG9 is selected when 001 is applied to the L1 node input gate 532, a "K" will be written into NREG9 during the N+1 cycle.

A similar analysis is applied to the remaining levels At level 2, bits 0-1 of the WID (00) select NREG4 418. Since the conditions at "AND" gate 524 are met, the latched L1 key ("C") is written into NREG4 418. At level 3, bit 1 of the WID (0) selects NREG2 426. Since the comparison results do not meet the conditions at any of the associated "AND" gates 518–522, the previous key data ("D") in NREG2 is left intact. Finally, at level 4, since the comparison results do not meet the conditions at any of the associated "AND" gates 510–516, the previous key data ("E") in NREG1 430 is left intact. Thus, at the end of cycle N+1, nodes 9, 4, 2 and 1 hold, respectively, keys K, C, D and E.

Turning next to FIG. 6, it should be understood that the results, L0="K", L1="C", L2="B", L3="D" and L4="E", from cycle N have previously been latched into the right side of the select key MUX 602. Since the conditions at the L2 "AND" gate are met, the latched L2 key ("B") is selected and written (along with its ID) into the winning key register 432. As previously described, the ID of the winning key (in this case 0001 since "B" originated from VREG1 is used by the circuitry of FIG. 4 to select and compare the next set of keys. The champion key itself (or its address in systems which manipulate key addresses instead of the keys themselves) is sent out to the processor store logic.

Turning now to FIG. 4, it will be observed that the multiplexors 436,440,444,448 will select VREG1, NREG8 402, NREG4 418, and NREG2 426 for comparison (NREG1 is always selected). By the end of cycle N+1, the comparators 464–484 will produce 10 results. These results, along with the new WID (0001) and the selected keys (U,J,C,D and E) will be latched into the appropriate latches of FIGS. 5 and 6 at the end of cycle N+1 for use in cycle N+2.

Figure 7B:
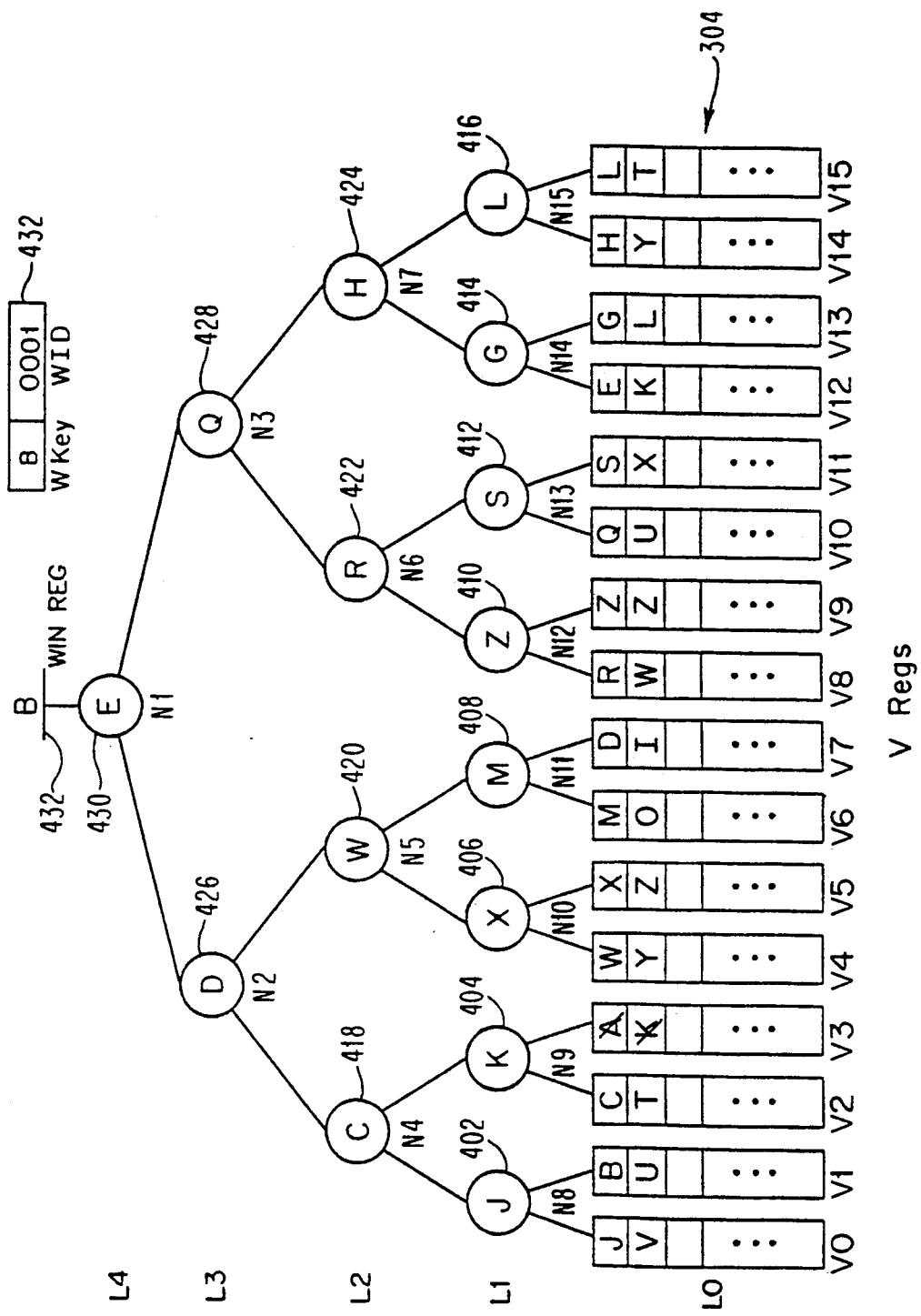
FIG. 7B shows the state of the tournament tree of FIG. 7B after the next cycle of comparison.
Figure 11:
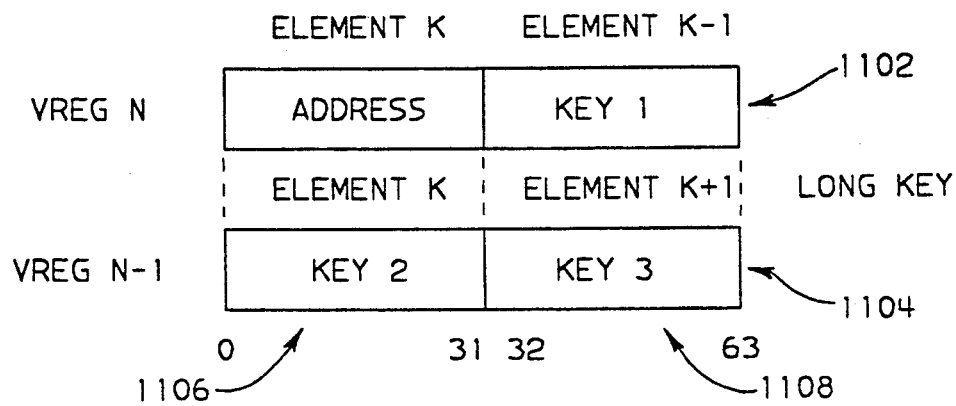
FIG. 11 illustrates the format of vector register data using a long key version of the VMERGE instruction.
Figure 12:
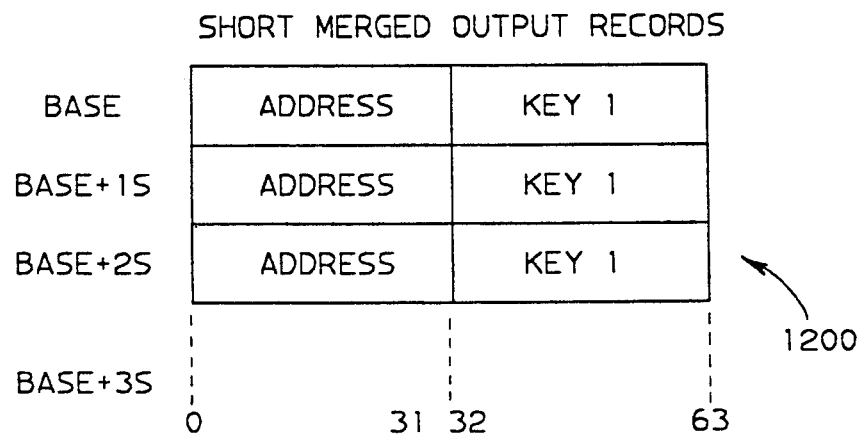
FIG. 12 illustrates the storage format of short key, merged output records.
Figure 13:
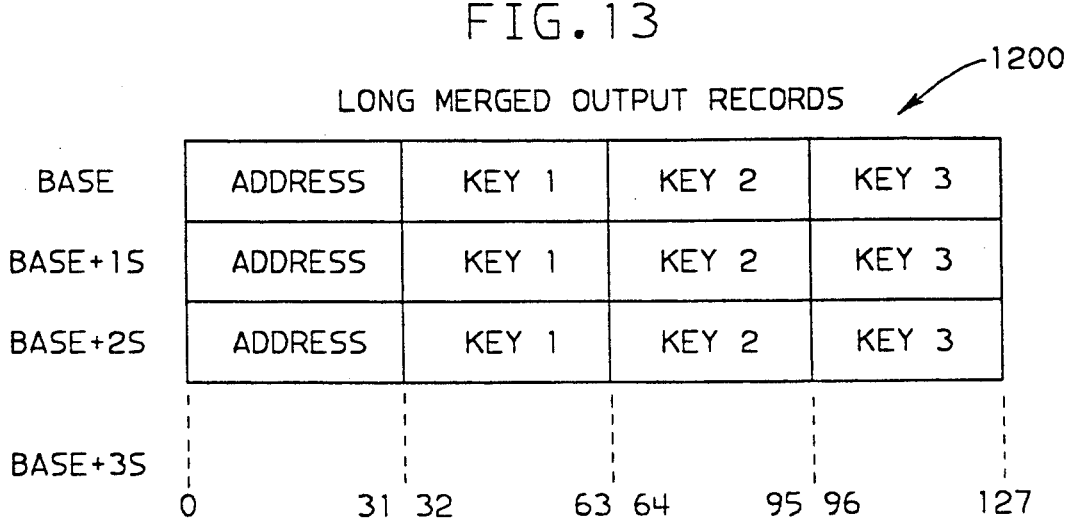
FIG. 13 illustrates the storage format of long key, merged output records.

FIG. 7B shows the state of the tournament tree/registers of FIG. 7A at the end of cycle N+1. Although not illustrated, the VIX for vector register 1 (V1) will be updated to point to the "U" key by the end of this cycle.

Figure 14:
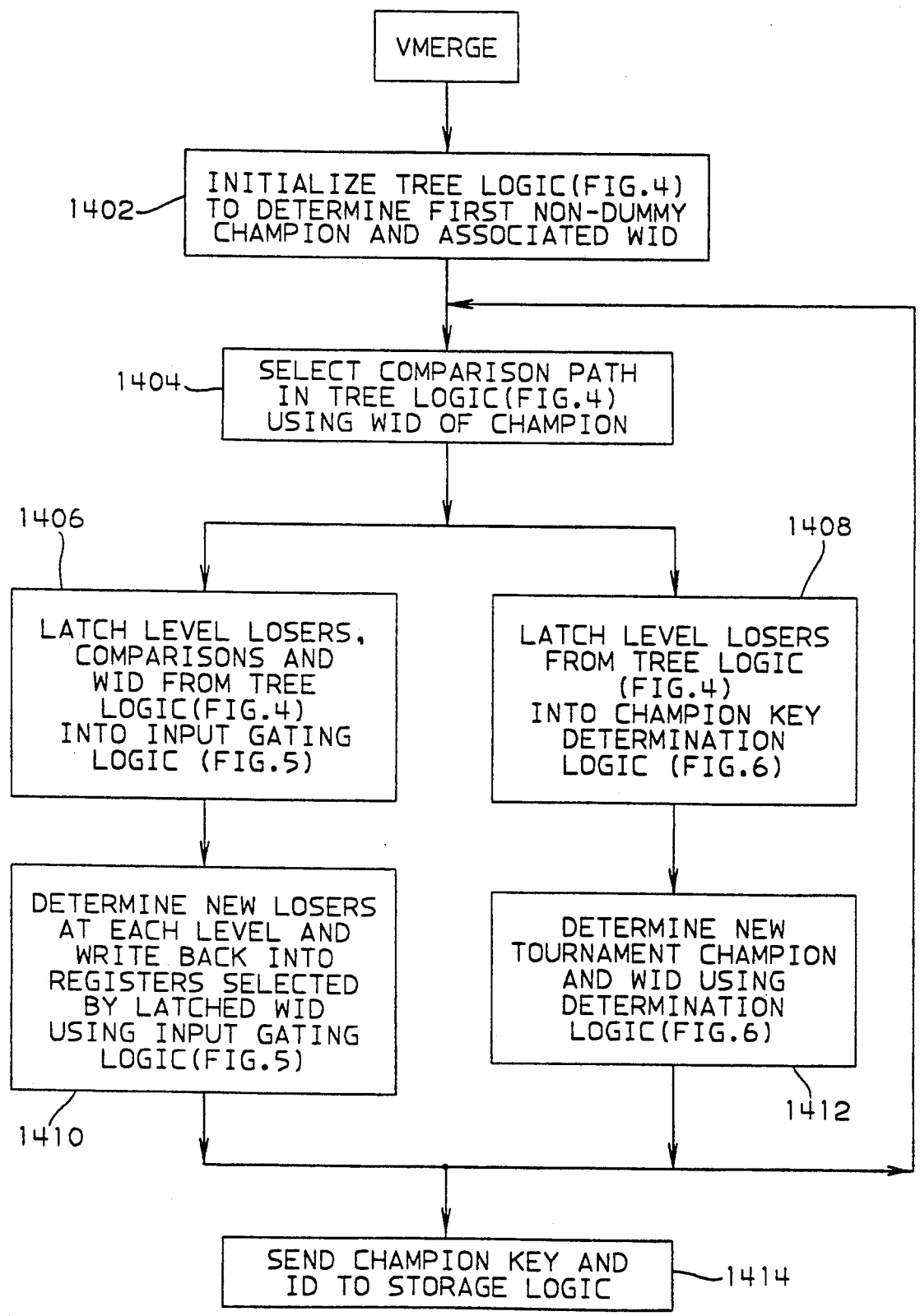
FIG. 14 is a flow chart of a vector merge operation using the logic of FIGS. 4 through 6.

It should be understood that in the embodiments of FIGS. 5 and 6, no data is written into the selected register when none of the "AND" conditions are met. Thus, the integrity of the existing register data is preserved. An alternative embodiment would be to latch up the existing register data into the right side of the select key MUXes 502–508, 602, and rewrite the data back into the selected register when none of the "AND" gates produce a "TRUE" result. The operation of the apparatus of FIGS. 4–6 is illustrated in FIG. 14. In summary, the operation is as follows:

1. The tree logic is initialized (block 1402). As part of the initialization process the first non-dummy champion and its associated WID are determined.
2. The ID of the champion key is used by the MUXes of FIG. 4 to select the next vector register and node registers for comparison (block 1404). The keys in the selected registers are then compared simultaneously by the comparators 464–482 of FIG. 4.
3. The comparison results, the selected keys, and the champion ID are then latched up for use in steps 4 and 5 (blocks 1406, 1408).
4. The results of the compares are sent to the AND qualified buffers 604–612 of FIG. 6, and the new champion is determined and written into the winning key register 432 along with its base ID (block 1412).
5. In parallel with step 4, the node registers are updated by the apparatus of FIG. 5 loading them with the losing keys along the path of the previous champion (block 1410).
6. Steps 2-5 are repeated iteratively. At the end of each iteration of step 4, the champion key and its associated ID (WID) are sent to the processor storage logic.

As is known in the art, key comparisons can be performed using offset coding (codewords). When using codewords a compare equal can occur. A compare equal causes the node operand and the challenger operand to be fetched using the Address ID, a new codeword to be formed, and a resumption of the update process. The operation, as performed within the vector sort, is similar to the conventional 370/XA Compare and Form Codeword except that 8 byte codewords are used. An expanded 12 byte key field is provided to reduce compare equal occurrences (when codewords are used to represent keys) or to handle short (up to 12 byte) keys directly. There is also a 4 byte address ID associated with each field. Up to 16 streams, of different lengths may be merged. Each stream may contain multiple strings. Every string in a stream must have the same length but that length may be any value up to $2^{31}$ power.

The record output comprises both address ID and the key data. If codewords are used to represent key data this makes them available for reuse in subsequent merges.

The control of the merge operation within the context of the vector facility of FIG. 3 will now be explained by reference to FIGS. 8-13. In order to initiate a merge using the ESA/370 vector facility a VMERGE instruction 800 is defined in conventional QST format as illustrated in FIG. 8. An even register of an even-odd general purpose register pair specified by the third operand 802 contains a Merge Mask which specifies the number of input vector register participating in the merge/sort operation. The odd register of the pair contains the length of the input string. Input vectors are merged into a single vector which is stored beginning at the base location specified by another general purpose register identified by the RS2 804 field of the second operand. The stride for incrementing the storage address is contained in a general purpose register specified by the RT2 field 806 of the second operand.

Merge data input may be codewords, as in the 370/XA Architecture Compare and Form Codeword Instructions, or actual key data. Two versions of the VMERGE instruction are provided, a short (1 word key) and a long (3 word key) format The format of FIG. 8 can be used for both instructions by using different mnemonics and OP codes to distinguish the VMERGE short instruction from the VMERGE long instruction. In both formats the vector register elements (specified by the first operand 808 of FIG. 8) are treated in pairs.

The use of the vector register elements in the short format is illustrated in FIG. 10. Each pair is one entry comprising a 1 word key address 1002 (in system memory) and a 1 word Key 1004. Up to 16 vector registers (short key version) may be merged. In the long key version (FIG. 11), even-odd vector registers 1102, 1104 are paired as well as even-odd elements 1106, 1108 to provide two additional words of key length. This reduces the merge to an 8 way maximum.

As described above, the merged output records contain both the Key and the address ID and are stored in system memory 1200 beginning at the location specified by the Base plus Stride (S) given by the registers identified in operand 2. The short and long formats are shown, respectively, in FIGS. 12 and 13.

As an alternative embodiment, VMERGE instructions using long and short format codewords can be provided. For example, a short codeword can be represented by 2 bytes of offset and 2 bytes of code and a long codeword can be represented by 4 bytes of offset and 8 bytes of code.

Codewords are stored in the merged output records along with their address ID for potential reuse. Each time output strings are merged a new string having greater length is formed. Assume initially that N records are in random order. This can be thought of as N strings each a Length L of 1. Assume a codeword for each record is computed with respect to the lowest possible key value of all zero. If an 8 way merge is performed, N/8 strings are created, where each string is now length 8. Each of the N/8 output strings have 8 codewords in sorted order all based on previous winning codewords (in that string). These codewords are therefor valid for use in another merge. Another pass creates N/64 strings each 64 long now having 64 valid codewords. Advantageously, reusing codewords from merge to merge will reduce the amount of time required to generate codewords. The effectiveness also depends upon the compare equal frequency. It is contemplated that the long key format will reduce compare equal codewords.

As described above, the third operand (QR3) 802 specifies a GPR even-odd pair. The even Register has a 16 bit mask. Each bit corresponds to a vector register. In the VMERGE SHORT instruction, if the bit is a one the corresponding vector register participates in the merge operation. FIG. 9A illustrates a VMERGE SHORT merge mask 900 for a 9 way merge of vector registers 1,2,3,4,5,8,9,13 and 14.

In the VMERGE LONG instruction, the bits representing odd values are ignored. If a bit representing an evenly numbered vector register is a one, the corresponding even-odd vector register pair participates in the merge operation. FIG. 9B illustrates a VMERGE LONG merge mask 902 for a 5 way merge of vector register pairs 2 and 3, 4 and 5, 6 and 7, 10 and 11, 14 and 15.

The odd GPR specified by QR3 contains the length of the input string. In the ESA/370 Vector Facility, the string may be up to the maximum length allowed by the 31 available bits. There are two cases to consider in describing the merge operation; (1) string lengths up to and including the vector register Section Size and (2) string lengths greater than Section Size.

In the first case more than one string may be held in a Vector register. Merging of several streams (VREGs) by the tree sort comprises selecting the first key of the first string from each stream, running a selection tournament and picking a winner. The next key in the first string of the winners input stream (VREG) is selected and another tournament is run. This continues for each winner. When string 1 runs out in a given stream the merge is reduced by one (stream temporarily eliminated) and the merge continues with the remaining streams. When all first strings from each stream has been depleted one merged output stream has been created.

The original vector register streams are reconnected to the tree and all the records of the second string are merged in the same manner. Full merges are repeated for as many times as there are strings. When the Vector Count (VCT) is reached the instruction is complete. It assumed all Vector Registers can be coded to have identical numbers of strings (discussed latter). Each stream string merge results in an output merged stream having a new string length of N×S where N is the number of vector registers being merged and S is the input string length. Multiple strings in each stream cause the process to be repeated VCT/2S times where VCT is the Vector Count and S equals string length. The factor of 2 division of VCT is due to the fact that each sort entry takes up 2 element positions of a vector register.

If a stream length exceeds its vector register length it must be handled in sections. A Merge Mask, Multiple Vector Count and Multiple VIXs are used. When a vector register becomes empty the instruction completes a condition code is set and a partial merge complete bit set. If the associated stream is not empty another section (or residual) can be loaded into the vector register by a VLOAD process. If however, the stream is empty a refill is impossible, the VMERGE can be resumed but only after the associated vector register has been eliminated from the merge. This is accomplished by turning off the vector registers Merge Mask bit. The merge, reduced by 1 is resumed using the remaining vector registers. Each vector registers VIX identifies the element to resume at. Each vector register is refilled as required or disconnected until all data streams are merged.

Each data stream may be a different length. This is implemented by introducing an expanded Vector Status Word containing multiple Vector Counts, one corresponding to each vector register. The Load Vector Count And Update (VLVCU) sectioning instruction, used to head up the sectioning loop, functions as normal. As each stream is depleted a vector register is masked out of the merge and the process repeated until all streams are similarly depleted. The main point to be made here is a multiple Vector Count can be made to work, together with the VLVCU sectioning instruction to handle multiple vector registers and variable length strings greater than the section size.

It should be understood that the invention has been described with respect to the preferred embodiments by way of example and not by way of limitation. Various changes and modifications that are within the scope and spirit of the claims will now become apparent to those of skill in the art that remain within the scope and spirit of the invention. For example, the tree logic 302 could be used in conjunction with a general purpose computer (not configured with a vector facility) which could be provided with special purpose registers to serve as the base nodes of the tree. Further, for short key applications, the general purpose registers (if wide enough) could serve as the tree's base nodes. Alternatively, an N-way set associative cache memory could be used to hold both the base and node data, where each set is devoted to a level of the tree and is addressed by the appropriate bits (as previously described) of the WID.

Having thus described our invention, what we claim as new and desire to secure by Letters Patent is:

1. An apparatus for sorting and merging database records, whereby a tournament champion is determined in each cycle, the apparatus comprising:

a root register;

a plurality of node registers coupled to the root register in a logical tree configuration so as to form a plurality of data paths;

a plurality of base registers, each of the base registers being coupled to one of the node registers;

a champion key register, coupled to the root register, having a first field for holding a key and a second field for holding address data identifying one of said base registers from which the key originated;

path selection means, coupled to the champion key register, for selecting one of the data paths, responsive to the address data held in the champion key register for a current tournament champion;

simultaneous compare means operating with the node registers in a currently selected path of the tree and the champion key register for determining in a single cycle of comparison, a next tournament champion among data represented in the node registers which form the currently selected data path selected by the path selection means, and for writing the key of the next tournament champion and the address data identifying the base register of origin into the champion key register; and update means, coupled to the path selection means, for updating the data in the node registers forming the data path selected by the path selection means.

2. The apparatus of claim 1, wherein the base registers are vector registers having a plurality of elements, each of the vector registers holding a contending key, each one of the vector registers further comprising:
   index means, coupled to the champion key register, for containing a pointer to one of the elements and for incrementing the pointer responsive to an indication by the second field that the tournament champion originated from the one of the vector registers.

3. The apparatus of claim 1 in which the update means updates data in the registers in the currently selected data path during the cycle of comparison after a next path is determined in the path selection means.

* * * * *